Dec. 14, 1965 H. MEYER 3,222,790
MEASURING INSTRUMENT
Filed Feb. 11, 1964 2 Sheets-Sheet 1

INVENTOR
HANS MEYER
BY Emery L. Groff Jr.
ATTORNEY

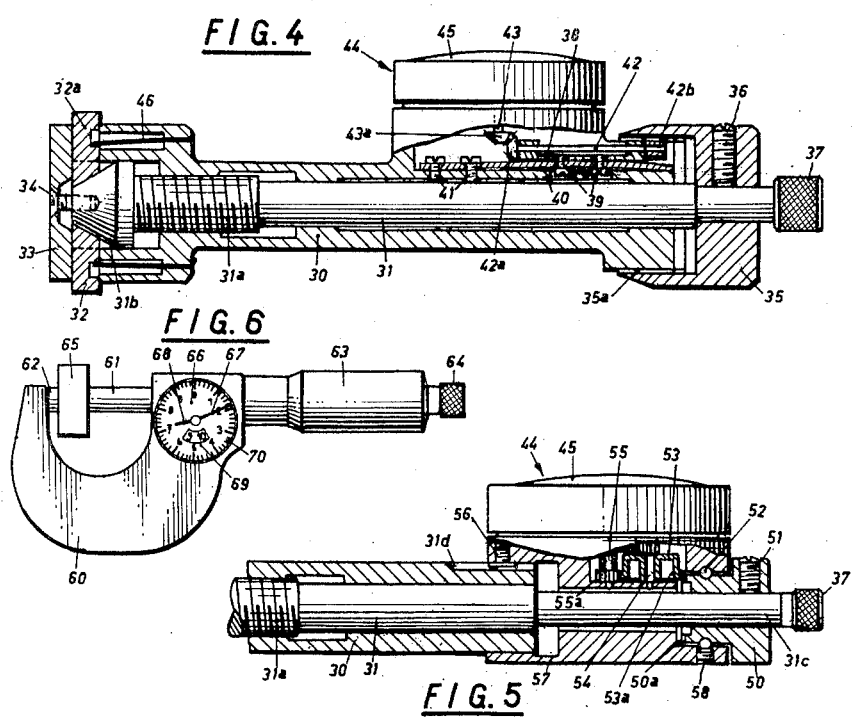

United States Patent Office

3,222,790
Patented Dec. 14, 1965

1

3,222,790
MEASURING INSTRUMENT
Hans Meyer, Le Bugnon 24, Renens, Vaud, Switzerland
Filed Feb. 11, 1964, Ser. No. 344,025
Claims priority, application Switzerland, Mar. 8, 1963,
2,970/63
2 Claims. (Cl. 33—166)

It is a well-known fact that measuring instruments of the type including a scale-carrying drum such as micrometers for instance do not permit an easy reading of the result obtained by the measurement.

This result cannot, in fact, be determined at a glance, and it is necessary to combine a plurality of measurements to arrive at the desired result. Thus, for instance, in the case of a micrometer, the millimeters and the half millimeters are read on a longitudinal scale uncovered by the edge of the drum, while the tenths and hundredths of a millimeter are provided by the actual subdivisions of the drum and the thousandths of a millimeter are obtained by a vernier cooperating with the latter scale. The reading of an instrument of this type involves therefore, even after some practice, a comparatively considerable loss of time and it leads to the possibility of error through an erroneous addition of the different partial readings when combined to form the complete result.

Means have already been proposed for removing such disadvantages for instance by coupling the threaded rod of the micrometer with a counter on which the measured value may be read directly with its decimals. This solution leads however to various drawbacks. On the one hand, the irregular resistance of the counter when driven, in particular in the case of accurate measuring instruments, acts objectionably on the measuring pressure. On the other hand, by a quick rotation of the spindle, driving the jerkwise working counter mechanism, said mechanism will be exposed to a series of strokes reducing its life and leading to objectionable disturbances.

Furthermore, the structure of all known counters requires a certain gear-clearance for constructional reasons, without which clearance it is impossible to obtain a satisfactory result.

This results in that mistakes in the indications of the measuring results arise, which jeopardize the accuracy of the measuring operation.

The invention has for its object to remove these various drawbacks and it relates to a measuring instrument which operates through rotation of a spindle, which is characterized by the fact that said spindle carries a step-up gear engaging the mechanism of a dial indicator on which the results of the measurements may be read directly.

A few embodiments of the invention are illustrated, by way of example, in the accompanying drawings, wherein:

FIGURE 4 is a partial longitudinal cross-section through another hole gauge.

2

FIGURE 5 is a partial cross-section of a third embodiment of a hole gauge.

FIGURE 6 is a view of a micrometer executed in accordanc with the invention.

Figure 1:
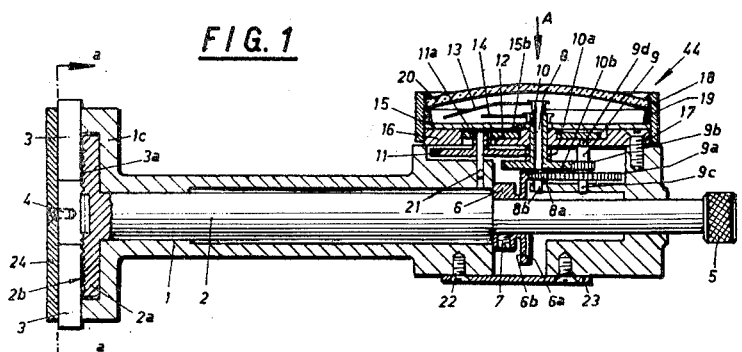
FIGURE 1 is a longitudinal cross-section through a hole gauge.

Turning to FIGURE 1, the body 1 carries a spindle 2 including a terminal flange 2a in which is formed a flat spiral thread 2b which is engaged by projections 3a on radially shiftable feeler rods 3. Said rods 3 are slidingly fitted in slots formed radially in the measuring head 1c of the body 1 and are held against dropping out by a cover 24 secured by screws 4 to said measuring head. A rotation of the spindle 2 by means of, for instance, a knob or ratchet brace 5 turns the spiral thread 2a and ensures a radial shifting of the feeler rods 3. A hub 6 which is rigidly secured to said spindle through a screw 7 has formed at one end thereof a thin flexible disc 6b periphery of which is provided with a series of teeth 6a. When the spindle 2 executes for instance one revolution, the measuring feelers 3 are urged outwardly by one pitch of the spiral thread 2b. Simultaneously, a point considered on the peripheral series of teeth 6a on the disc 6b travels over a distance which corresponds to one complete revolution of the latter. If, for instance, the pitch of the spiral thread 2b is equal to 1 mm., while the pitch diameter of the series of teeth 6a is equal to 16 mm., the ratio obtained between the travel of a point selected at the periphery of said series of teeth 6a and that of the feeler rod 3, is as between $16\pi$ and 1, that is about as between 50 and 1.

This amplification of the measuring travel is transmitted to an indicator dial 44 in the following manner: The annular series of teeth 6a engages the teeth 8a, of a pinion which is rigid with a further spindle 8 extending radially with reference to the spindle 2 inside the body 1 in which it is revolvably carried at its lower end 8b. The upper end of the spindle 8 carries a hand 13 adapted to move over the scale 15a (FIGURE 3) formed on a dial 15. The transmission ratio between the teeth 6a and 8a is selected advantageously in a manner such that an increase of the travel of the two rods 3 by 1 mm. corresponds to 10 revolutions of the hand. A revolution of the hand 13 corresponds thus to a measuring travel equal to 0.1 mm. and the FIGURE 15c on the dial 15 give out consequently the hundredths of a millimeter of the travel to be measured. Since the hundredths of a millimeter are subdivided on the dial 15 each into ten scale subdivisions, it is an easy matter to read the thousands of a millimeter forming part of the measurement made.

In order to obtain a satisfactory transmission between the shifting of the measuring feeler rods and the indications given out, the transmission members should not have any clearance with reference to one another. For this reason, the disc 6b on the hub 6 is shaped in a manner such that it can move elastically in an axial direction, whereby a clearance-free engagement between the two series of teeth 6a and 8a is obtained, together with elimination of any clearance for the pivot 8b in its carrier means.

The indicating system according to FIGURE 1 is controlled by transmission members which alow defining further decimal fractions of the figures obtained through the measurement. The spindle 9 parallel with the spindle 8 carries a pinion 9a meshing with the pinion 8a and also a further pinion 9b which engages a pinion 10b rigid with the hollow spindle 10 surrounding the spindle 8. The spindle 9 is revolvably carried at its ends respectively in the body 1 at 9c and at 9d in a plate 16 secured to the body 1 by the screws 17. The hollow spindle 10 carries a hand 14 which moves, by reason of a suitable selection of the transmission ratio ten times slower than the hand 13. Said hand 14 gives out the tenths of a millimeter forming part of the result of the measurement.

A pivot 21 fitted in the body 1 carries revolvably a pinion 11 which meshes with a pinion 10a secured to the hollow spindle 10 and drives on the other hand, through the further pinion 11a coaxially rigid with it the toothed wheel 12 revolvably carried round the axis of the spindles 8 and 10. Said wheel 12 carries figures 12a which may be read through a gate 15b formed in the dial 15. Since the wheel 12 revolves, by reason of the ratio selected for the gears, ten times slower than the hand 14, said disc carrying figures ranging between 61 and 70 allows reading the total complete millimeters forming part of the result of the measurement assumed to lie within said range of 60 to 70 mm.

Figure 2:
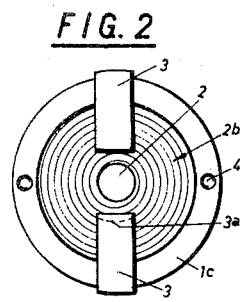
FIGURE 2 is a cross-section of said gauge through line a—a of FIGURE 1.

The indicator dial illustrated in FIGURES 1 and 2 allows thus obtaining with millimeters as units the result of the measurement ranging between 60 and 70 mm. with three decimal figures.

Figure 3:
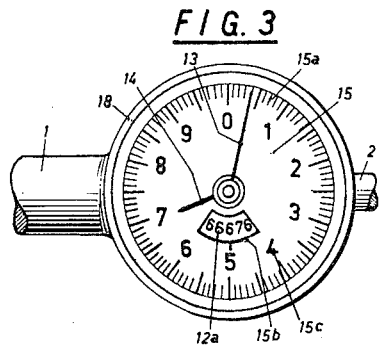
FIGURE 3 is a view of the gauge in the direction of the arrow A showing the indicating clock dial of FIGURE 1.

In the case illustrated in FIGURE 3, the result of the measurement may be read 66.704 mm.

Through a suitable selection of the transmission ratio, it is possible to obtain other ratios for the gears, in particular so as to serve with British and American measuring systems.

The dial 15 may be protected in the usual manner by a transparent disc 20 resting on a ring 19 and held in position by a bezel 18. The lower cover 23 secured to the body 1 by screws 22 serves for the protection of the opening provided for the assembly of the hub 6.

In the example illustrated in FIGURE 1, the spindle executes no axial movement. In many measuring instruments such as micrometers for instance such movements are however necessary.

Two further ebodiments for such types of instruments are illustrated in FIGURES 4 and 5.

FIGURE 4 shows a hole gauge wherein the spindle 31 provided with a micrometer thread 31a is positioned inside a body 30 and carries at its front end a measuring cone 31b. Upon rotation of the spindle 31 by means of a drum 35 secured to said spindle by a screw 36, or else, through a ratchet brace or control knob 37, the measuring cone 31 moves axially and actuates thereby the measuring feeler rods 32 in radial directions. Said measuring rods are positioned inside the body 30 and their dropping out is prevented by a cover 33 secured by means of screws 34. The springs 46 provided inside the body engage the notches 32a in the rods 32 so as to ensure the engagement of the measuring rods with the cone 31b.

The drum 35 is provided with an inner series of teeth 35a meshing with a pinion 42b secured to the spindle 42 substantially parallel with the spindle 31. Said spindle 42 carries a bevel pinion 42a meshing with a further bevel pinion 43a, rigid with a radially extending spindle 43 carrying the indicator hand. The indicating mechanism the remainder of which is not illustrated in the present case, cooperates with the dial 44 capped by the protecting transparent disc 45 and can be executed in the manner disclosed with reference to FIGURES 1 to 3.

In order that the transmission between the drum 35 and the indicating means may be obtained without any clearance, the spindle 42 is carried in a support 38 which is secured in its turn to a blade spring 40 through the agency of screws 39. The blade spring 40 is secured at one end by the screws 41 to the body 30.

The whole arrangement is such that the spindle 42 is urged slightly outwardly in a radial plane, so as to cut out any clearance between the cooperating teeth. The shape of the spring blade 40 prevents at the same time any lateral shifting. The support is furthermore guided in a slot formed in the body 30 in a manner such that it cannot execute any angular movement round the axis of the spindle.

The inner teeth 35a on the drum are long enough for them to remain engaged with the pinion 42b throughout the complete operative measuring travel of the spindle 31.

FIGURE 5 illustrates a solution which allows executing instruments of a particularly short size. The indicating mechanism on the dial 44 is fitted, in this case, on an auxiliary body 57 which slides over the body 30 and is held against rotation with reference to said body 30 by a groove 31d, cooperating with the key 56; a hub 50 is carried on the spindle 31c and is secured thereto by means of a screw 51. Said hub carries at one end a peripheral series of teeth 50a which engage the teeth 53a on the wheel 53 and mesh with the hand-controlling pinion 55a rigid with the hand-carrying spindle 55.

The wheel 53 fitted on a pivot 54 rigid with the auxiliary body 57 may act also simultaneously in the same manner as the wheel 9a illustrated in FIGURE 1, and it is designed so as to eliminate the clearance between the teeth by reason of its bell-shaped series of teeth being slightly compressed between the teeth 50a and 55a and thereby engaging the latter elastically. The hub 50 and the body 57 are connected revolvably with each other by means of balls 52 which are caused to enter an opening which may be closed thenafter by a screw 58.

In FIGURE 6 is illustrated a micrometer which is provided with an indicating dial. The instrument includes the conventional body 60 inside which the rigid usual stop 62 is inserted. The threaded spindle 61 and the driving drum 63 carried by the latter are positioned with the ratchet brace or knob 64 in the usual manner in the body 60. 65 is the article to be measured. On the part of the body 60 carrying the spindle is fitted a dial 66. The hands turning over the latter are driven by a mechanism of the type illustrated in FIGURE 4 and including an inner series of teeth provided in the drum 63 and not illustrated.

The longer hand 67 shows, in cooperation with an annular scale 70 the hundredths of millimeter of the result of the measurement and also the fractions thereof. The shorter hand 68 shows the tenths of a millimeter, whereas the complete millimeters may be read through the gate 69. The figure given out by the measurement illustrated in FIGURE 6 read 9.718 mm.

The arrangements illustrated hereinabove with reference to the accompanying drawings show the advantage consisting in that the reading, more particularly that of the last decimal digits, may be obtained through the position of hands on a dial, in the same manner as time; this ensures an immediate reliable reading of the result of a measurement, which is of particular interest in the case of a long series of measurements. The transmission of the position of the spindle onto the indicating means is at the same time free from clearance because of the elasticity provided for the transmission members and, consequently, even the two last decimal digits of the result of a measurement may be read without any mistake in the transmission.

It is of advantage for the elastic transmission wheels 6b (FIGURE 1) and 53 (FIGURE 5) to be made of plastic material such as a polyamide, polyvinyl chloride and the like.

The above-disclosed transmission provides a uniform resistance against driving within the proposed range of measurements and, furthermore, said resistance may be reduced to a very low figure through a substantially frictionless positioning of the transmission wheels. Thus, the measuring pressure is practically uninfluenced thereby and the accuracy in measurement of the instrument remains entire.

I claim:
1. In a size-measuring instrument provided with a rotatable control spindle, the combination of step-up means including a peripherally toothed step-up member rigid with the spindle, and provided with a flexible toothed rim, a dial indicator mechanism controlled by said toothed step-up member, the dial indicator showing the digits and decimals of the measured size.

2. In a size-measuring instrument provided with a rotatable control spindle, the combination of step-up means including a peripherally toothed step-up member rigid with the spindle, a pinion including a flexible toothed rim meshing with said toothed step-up member, a dial indicator mechanism controlled by said pinion, the dial indicator showing the digits and decimals of the measured size.

References Cited by the Examiner

UNITED STATES PATENTS

| | | | |
|---|---|---|---|
| 495,379 | 4/1893 | Smith | 33—166 |
| 1,021,384 | 3/1912 | Smith | 33—166 |
| 1,065,744 | 6/1913 | Sutorik | 33—166 |
| 1,389,028 | 8/1921 | Colburn | 33—166 |
| 2,566,685 | 9/1951 | Tvrzicky | 33—147 |
| 2,957,247 | 10/1960 | Brown et al. | 33—147 |

OTHER REFERENCES

Guttmann, F. T.: "18 Ways To Control Backlash in Gearing," pages 71–75, in Product Engineering, McGraw-Hill, October 26, 1959.

ISAAC LISANN, *Primary Examiner.*